United States Patent [19]

Rodriguez et al.

[11] Patent Number: 5,308,534
[45] Date of Patent: May 3, 1994

[54] ALKALINE-EARTH BASED SORBENT FOR REMOVING EFFLUENT FROM A GAS STREAM

[75] Inventors: Domingo Rodriguez, Col. Carrizal; José Carrazza, San Antonio de los Altos; Alejandro Izquierdo, Los Teques; Cebers O. Gómez, San Antonio de los Altos; Felix Silva, Merida, all of Venezuela

[73] Assignee: Intevep, S.A., Caracas, Venezuela

[21] Appl. No.: 897,917

[22] Filed: Jun. 12, 1992

[51] Int. Cl.⁵ .................................................. C09K 3/00
[52] U.S. Cl. .................................... 252/189; 252/190; 252/191; 252/192
[58] Field of Search ........................ 252/189, 190, 191

[56] References Cited

U.S. PATENT DOCUMENTS

| | | | |
|---|---|---|---|
| 4,191,115 | 3/1980 | Yang et al. | 110/347 |
| 4,424,197 | 1/1984 | Powell et al. | 423/244 |
| 4,626,418 | 12/1986 | College et al. | 423/243 |
| 4,795,586 | 1/1989 | Thompson et al. | 252/188.1 |
| 5,096,691 | 3/1992 | Bedell | 423/576.6 |

Primary Examiner—Richard D. Lovering
Assistant Examiner—Joseph D. Anthony
Attorney, Agent, or Firm—Bachman & LaPointe

[57] ABSTRACT

The present invention relates to an improved sorbent for use in removing effluents such as sulfur dioxide from combustion gas streams. The sorbent comprises a hydroxide formed from an alkaline-earth based material such as lime and having incorporated therein an iron and organic compound promotion addition to enhance its ability to remove effluents from the gas stream. The sorbent is formed by co-dissolving an iron salt and an organic compound in a hydration solution and thereafter mixing the hydration solution containing the iron salt and the organic compound with an alkaline-earth based material. The sorbent thus produced may be injected into a gas stream in either dry or slurry form to remove the effluents.

12 Claims, No Drawings

ALKALINE-EARTH BASED SORBENT FOR REMOVING EFFLUENT FROM A GAS STREAM

BACKGROUND OF THE INVENTION

The present invention relates to an improved alkaline-earth based sorbent for removing effluent such as sulfur dioxide from a combustion gas stream, a process for preparing this sorbent, and a process for using it.

Processes for removing environmentally harmful effluents from a gaseous combustion stream using sorbents are known in the art. A number of attempts have been made to increase process effectiveness by manufacturing a more effective sorbent for removing these effluents from a gas stream such as combustion flue gases. Some of these attempts have involved the incorporation of iron into a sorbent material. For example, the articles, "Enhanced Sulfur Capture By Promoted Calcium-Based Sorbents", by D. M. Slaughter, S. L. Chen and W. R. Seeker, Proceedings: 1986 Joint Symposium on Dry $SO_2$ and Simultaneous $SO_2/NO_x$ Control Technologies (EPRI CS-4966, Volume 1), pages 12-1 to 12-24 (1986) and "The Effectiveness of Additives for Enhancing $SO_2$ Removal With Calcium Based Sorbents", by L. J. Muzio, G. R. Offen, A. A. Boni and R. Beittel, Proceedings: 1986 Joint Symposium on Dry $SO_2$ and simultaneous $SO_2/NO_x$ Control Technologies (EPRI CS-4966, Volume 1), pages 13-1 to 13-23 (1986), both report studies which indicate that the addition of iron to a calcium-based sorbent offers no enhancement in sulfur capture. In both of these studies, the iron source $[Fe(NO_3)_3]$ was dissolved in water, and the solution mixed with CaO (lime) for preparation of the sorbent. In this formulation, however, as soon as the solution comes into contact with CaO, it becomes alkaline ($pH > 7$). This causes the precipitation of iron hydroxide [FeO(OH)]. The result is that these formulations led to the mixing of a water-insoluble iron compound with a calcium-based sorbent, which is an ineffective method to achieve promotion by iron.

In patent application Ser. No. 657,442, filed Feb. 19, 1991, for "In-Situ Removal of Effluent from a Gaseous Stream by Injection of an Effluent Sorbent Into Downstream of the Combustion Zone", it was disclosed that water soluble salts of iron can enhance the reactivity of alkaline-earth water-insoluble compounds toward sulfur dioxide. In one embodiment described in that application, ferrous gluconate is dissolved in water, and then the solution is mixed with CaO. The resulting material is a dry $Ca(OH)_2$ powder containing the iron promoter. When this material is put in contact at 1100° C. with gases containing sulfur dioxide, up to 60% of the calcium reacts with the sulfur dioxide and oxygen to form $CaSO_4$ in less than one second. When pure $Ca(OH)_2$ is subjected to the same reaction conditions, only 35% of the calcium can be converted to $CaSO_4$. This embodiment demonstrates that the effective incorporation of iron can enhance the reactivity of calcium-based materials and therefore, make them better suited sorbents for applications for sulfur dioxide removal.

Sugars by themselves have also been claimed as promoters for calcium-based sorbents used in the removal of sulfur dioxide. College and Vinatry in U.S. Pat. No. 4,626,418, for example, claim that the addition of a sugar solution to CaO during preparation of the sorbent leads to an enhancement in sulfur dioxide removal.

It is an object of the present invention to provide an improved sorbent which may be used to remove effluent from a combustion gas stream.

It is a further object of the present invention to provide an alkaline-earth based sorbent as above which is highly reactive towards sulfur dioxide.

It is still a further object of the present invention to provide a sorbent as above which contains organic compound(s) for ensuring that an iron promoting material remains in solution upon contact with an alkaline-earth based sorbent.

Yet another object of the present invention is to provide a process for making the above sorbent and a process for using it to remove sulfur dioxide from a gas stream.

Still other objects and advantages of the present invention will become clearer from the following description.

SUMMARY OF THE INVENTION

In accordance with the present invention, an improved sorbent having a promoter is provided for removing effluent such as sulfur dioxide from combustion gas streams. This is accomplished by preparing a sorbent that is highly reactive toward sulfur dioxide and that contains an alkaline-earth based sorbent material promoted by a mixture of an iron salt and an organic compound.

The present invention takes advantage of the discovery that by co-dissolving an organic compound with iron salt in a hydrating solution, the organic compound ensures that the iron remains in solution upon subsequent contact with an alkaline-earth based material such as CaO (lime). This occurs because the compound forms a complex with iron, preventing its precipitation when the solution becomes alkaline.

In accordance with the present invention, the alkaline-earth based sorbent material may be a magnesium compound, a calcium compound or mixtures thereof. The iron salt to be incorporated into the sorbent as a promoter may be selected from the group consisting of ferric sulfate, ferric nitrate, ferric chloride and mixture thereof. While in general the organic compound to be mixed with the iron salt and incorporated into the sorbent may be any organic molecule that will form a stable complex with iron in an alkaline solution, an organic compound selected from the group consisting of glucose, fructose, glycerol, sorbitol and gluconic acid and mixtures thereof has been found to be an effective addition.

The process for forming the sorbent of the present invention broadly comprises co-dissolving the iron salt and the organic compound in a hydrating solution and thereafter adding the hydrating solution with these promotion additions to an alkaline-earth based material such as CaO. The mixture can be heated to dryness or the hydration water may be added in such an amount that the final product is dry. Alternatively, the process may be such that the sorbent material with the promoter additions is in the form of a slurry.

The sorbent of the present invention may be injected into a combustion gas stream such as an off-gas stream at a controlled temperature. During injection, the sorbent reacts with the sulfur dioxide in the gas stream, effectively removing it from the gases.

DETAILED DESCRIPTION

The aim of the present invention is to provide a sorbent which effectively removes effluent such as sulfur dioxide from combustion gas streams such as flue gases. This is accomplished by preparing a sorbent material which is highly reactive toward sulfur dioxide. In accordance with the present invention, the sorbent contains an alkaline-earth based sorbent material having a promoter addition comprising a mixture of an iron salt and an organic compound.

The novel sorbent of the present invention is prepared by first dissolving an iron salt and an organic compound in a hydrating water solution. Because of economic considerations, the iron salt may be selected from the group consisting of ferric sulfate, ferric nitrate, ferric chloride and mixtures thereof with ferric sulfate being a preferred metal additive. The organic compound addition may be any organic molecule that will form a stable complex with iron in an alkaline solution. Effective organic compounds which may be used include glucose, fructose, glycerol, sorbitol, gluconic acid and mixtures thereof. Because of economic considerations, glucose and fructose are preferred organic compounds, which can be obtained from corn syrups or other available syrups. One of the advantages of using the aforementioned organic compounds is that they allow th use of inexpensive iron sources such as the aforementioned iron salts which would otherwise ordinarily led to the precipitation of FeO(OH) during preparation of the sorbent.

As previously mentioned, the organic compound is added to the iron salt because of its ability to stabilize iron salts in an alkaline solution. It is believed that stabilization occurrs because the organic compound forms a complex with iron, preventing its precipitation when the solution becomes alkaline.

During this dissolution step, from about 2.0 grams. to about 90 grams, preferably from about 5 grams to about 30 grams, of the iron salt promoting additive is dissolved in about 100 grams of a hydration water solution. Additionally, from about 2.0 grams to about 80 grams, preferably from about 2.5 grams to about 25 grams, of the organic compound is added to and dissolved in the hydration water.

The hydration solution containing the iron salt and the organic compound is then mixed with an alkaline-earth based material which upon reaction with water becomes a hydroxide. The alkaline-earth based material may be magnesium compound such as MgO, a calcium compound such as CaO (lime), or mixtures thereof. Any calcium or magnesium compounds, such as hydroxides or carbonates, that upon calcination generate the respective oxide are suitable for this application. The hydration solution with the iron salt and organic compound promoting additions may be added in a quantity, such as 40-60% of the mass of the alkaline-earth based material, so as to form a dry sorbent material such as dry $Ca(OH)_2$. In other words, from about 40 grams to 75 grams of said hydration solution containing the iron salt and the organic compound may be mixed with about 100 grams of the alkaline-earth based material to form the sorbent. Alternatively, the hydration solution containing the aforesaid additions may be added in a quantity which requires the resulting mixture to be heated to dryness to form a sorbent to be injected into the gas stream. During this mixing step, the organic compound keeps the iron from the iron salt in solution during the hydration of the alkaline-earth base material.

The final sorbent product has incorporated in its bulk structure both the iron and organic compound promoters. In said final sorbent product, it is desirable that the molar ratios of both iron and organic compound to sorbent be in the range of from about 0.005 to about 0.1, preferably from about 0.01 to about 0.03. It is also desirable that the organic compound-to-iron molar ratio should be between about 0.25 and about 4.0, preferably between about 0.3 and about 1.0. Still further, the dry sorbent material should be characterized by an average particle size less than or equal to 50 microns, preferably less than 10 microns.

While dry powders are a preferred embodiment of the present invention, slurries of alkaline-earth hydroxides containing the iron salt and the organic compound promotion additives in an aqueous phase are also effective sorbents for effluent removal.

The highly reactive sorbent thus formed may be injected into a gas stream such as a flue gas stream in the form of a slurry or a dry solid. The sorbent may be injected into the off-gas stream downstream of the combustion zone under controlled conditions at a controlled off-gas stream temperature. For example, the effluent sorbent may be injected into a boiler, in a controlled manner, downstream of the combustion zone. The temperature of injection depends on the metal oxide used as a sorbent. The upper temperature limit is dictated by the thermodynamic stability of the metal sulfate which is formed. The lower temperature limit is related to sulfation kinetics. For the preferred sorbents, oxides of alkaline-earths, the temperature of injection is between about 900° C. and about 1200° C.

An alternative embodiment of the present invention involves the injection into the off-gas stream of a spray of the sorbent slurry. In this particular case, the mixture of the iron salt plus the organic compound is dissolved in the slurry water. When the spray droplets are injected into the hot off-gas stream, water evaporates leaving behind the promoter as a coating on the sorbent solid particles.

The following examples are presented to illustrate the present invention and specific features thereof but are in no way intended to be limiting.

EXAMPLE I

The effectiveness of an embodiment of the sorbent of the present invention is illustrated by this example. A series of calcium based sorbents were prepared starting with CaO. In a first case, an of water in amounts of 50–60% of the CaO mass was made to produce a dry $Ca(OH)_2$ powder ready to be injected into a flue gas stream. In a second case, a mixture of $Fe_2(SO_4)_3$ and glucose was dissolved in the same amount of water as in the first case. The solution was then mixed with CaO so as to prepare a dry $Ca(OH)_2$ powder containing both promotion additives. Two other sorbents were prepared following the same procedure just described but only adding either an $Fe_2(SO_4)_3$ or glucose. In the cases wherein $Fe_2(SO_4)_3$ was used, the molar ratio of Fe to Ca was equal to 0.03. In the cases where glucose was used, the molar ratio of this compound to Ca was also equal to 0.03.

All the prepared materials were injected separately into a flue gas stream at 1100° C. containing approximately 2500 ppm of sulfur dioxide. The contact time between the sorbents and the flue gas was approximately 1 second. All sorbents were injected at such a rate that the molar flow of Ca fed divided by the molar flow of sulfur dioxide in the gas stream was equal to 1.0.

The concentration of sulfur dioxide in the flue gases was measured during injection of the sorbents. When plain $Ca(OH)_2$ was injected, the sulfur dioxide concentration in the flue gas was measured at 1625 ppm, which represents a 35% reduction over the level in the absence of a sorbent. When the sorbent containing the mixture of $Fe_2(SO_4)_3$ and glucose was injected, the sulfur concentration in the flue gases was equal to 1225 ppm, which represents a 51% reduction. When the sorbent containing only glucose as an additive was injected, the sulfur dioxide concentration decreased only to 1573 ppm, corresponding to a 37.1% reduction. Finally, when the sorbent containing only $Fe_2(SO_4)_3$ was injected, the sulfur dioxide concentration was equal to 1878 ppm, corresponding to only a 24.9% reduction.

Even though in all cases the injection of the sorbent led to a reduction in the sulfur dioxide concentration, the decrease was substantially higher when the sorbent containing $Fe_2(SO_4)_3$ and glucose promotion additives was injected. This enhancement in sulfur dioxide removal cannot be attributed to a promotional effect by glucose alone, since the reduction achieved with a sorbent containing only this additive was lower. On the other hand, the presence of glucose is necessary, since the level of sulfur dioxide removal achieved with a sorbent containing only $Fe_2(SO_4)_3$ as an additive is even lower than in the case of plain $Ca(OH)_2$.

EXAMPLE II

A series of calcium-based sorbents containing mixtures of $Fe_2(SO_4)_3$ plus an organic compound as additives were prepared following a procedure similar to the one described in the previous example. The organic compounds used in the preparation of these sorbents were sorbitol, gluconic acid, glycerol and fructose. In all cases, the molar ratio of Fe to Ca was equal to 0.03, and the molar ratio of the organic compound to Fe was equal to 1.0.

All the prepared materials were injected separately into a flue gas stream at 1100° C. containing approximately 2500 ppm of sulfur dioxide. The contact time between the sorbents and the flue gas was approximately 1 second. All sorbents were injected at such a rate that the molar flow of Ca fed divided by the molar flow of sulfur dioxide in the gas stream was equal to 1.0.

The concentration of sulfur dioxide in the flue gases was measured during the injection of the sorbents. When the sorbent containing the mixture of $Fe_2(SO_4)_3$ and sorbitol was injected, the sulfur dioxide concentration decreased to 1250 ppm which represents a 50% reduction. When the sorbent containing the mixture of $Fe_2(SO_4)_3$ and glycerol was injected, the sulfur dioxide level decreased to 1050 ppm, representing a 58% reduction. In the case of $Fe_2(SO_4)_3$ plus gluconic acid, the measured level was also 1050 ppm, representing another 58% reduction. In the case of fructose plus $Fe_2(SO_4)_3$, the measured level was 1225 ppm, representing a 51% reduction. As described in Example I, when plain $Ca(OH)_2$ was injected into a similar flue gas stream, the decrease in sulfur dioxide concentration from the flue gases is only 35%; and when $Ca(OH)_2$ containing $Fe_2(SO_4)_3$ alone was injected, the decrease was even lower (24.9%).

The results described in this example clearly show that promotion additions of an iron salt plus an organic compound effectively incorporated into $Ca(OH)_2$ lead to substantial increases in the reactivity of such sorbents toward sulfur dioxide. All of these organic compounds have in common the fact that they are able to prevent the precipitation of FeO(OH) when codissolved in an alkaline medium with an iron salt.

To demonstrate the criticality of employing an organic compound that prevents the precipitation of iron in an alkaline medium, a sorbent containing a mixture of $Fe_2(SO_4)_3$ and acetic acid was prepared and tested. This mixture was chosen because acetic acid is not able to stabilize iron in solution in alkaline media. The sorbent was prepared following the same procedure described in Example I, and tested under the exact same conditions as the sorbents previously described in this example. Both the molar ratios of acetic acid- and iron-to-calcium molar ratios were equal to 0.03. When this sorbent was injected into the furnace, the sulfur dioxide concentration decreased to 1625 ppm, which represents a 35% reduction over the level in the absence of sorbent. This is the same reduction level achieved with plan $Ca(OH)_2$. Therefore, a mixture of acetic acid and $Fe_2(SO_4)_3$ does not enhance the reactivity of Ca based sorbents, in contrast with the other mixtures described in this and the previous example.

EXAMPLE III

This example demonstrates the feasibility of employing, in embodiments of the process of the present invention, commercial products that contain mixtures of organic compounds that stabilize iron in alkaline solution.

A sorbent containing a mixture of $Fe_2(SO_4)_3$ and a commercial syrup was prepared following the same procedure described in Example I. The corn syrup contained a mixture of carbohydrates: Glucose in a 52 weight-percent, fructose in a 42 weight-percent, with the difference being polysaccharides. The amounts of $Fe_2(SO_4)_3$ and syrup used for preparation of the sorbent were such that the iron-to calcium and glucose plus fructose-to-calcium molar ratios were equal to 0.015.

The sorbent was tested in the same furnace and under the same experimental conditions as in Examples I and II. When this sorbent was injected, the sulfur dioxide level in the flue gases was measured at 1225 ppm, representing a 51 percent reduction over the level in the absence of sorbent. This level of reduction is similar to those achieved with mixtures of glucose plus $Fe_2(SO_4)_3$ and fructose plus $Fe_2(SO_4)_3$ by themselves, and much higher than with plain $Ca(OH)_2$. This result demonstrates that commercial products containing either single components or mixture of components able to stabilize iron salts in alkaline solutions are also effective additives in the process of the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, an all changes which come within the meaning and range of equivalency are intended to be embraced therein.

We claim:

1. A process for preparing an improved sorbent for use in removing effluents from a gas stream. said process including the steps of:
    providing an iron salt and an organic compound capable of stabilizing said iron salt in an alkaline solution;

dissolving said iron salt and said organic compound in a hydration solution to form an organo-metallic complex from said iron salt and said organic compound wherein said iron salt is added to said hydration solution in an amount from about 2.0 to about 90 grams per 100 grams of said hydration solution and said organic compound is added to said hydration solution in an amount from about 2.0 to 80 grams per 100 grams of said hydration solution; and mixing from about 40 to about 75 grams of said hydration solution containing said organo-metallic complex of said iron salt and said organic compound with about 100 grams of an alkaline-earth oxide material to form a hydroxide sorbents, whereby said organic compound during said mixing step keeps iron in said iron salt in solution during the hydration of said alkaline-earth based material.

2. The process of claim 1 wherein said providing step comprises providing an iron salt selected from the group consisting of ferric sulfate, ferric nitrate, ferric chloride, and mixtures thereof.

3. The process of claim 1 wherein said providing step comprises providing an organic compound selected from the group consisting of glucose, fructose, glycerol, sorbitol, gluconic acid and mixtures thereof.

4. The process of claim 1 wherein said providing step comprises providing from about 5 to bout 30 grams of said iron salt and from about 2.5 to about 25 grams of said organic compound per 100 grams of said hydration solution.

5. The process of claim 1 wherein said mixing step comprises mixing said hydration solution with an alkaline-earth base material selected from the group consisting of a magnesium oxide, a calcium oxide and mixtures thereof.

6. The process of claim 1 further comprising heating said mixture of said hydration solution and said alkaline-earth base material to a dryness temperature so as to form a dry sorbent product.

7. An improved sorbent for removing effluents from a gas stream, said sorbent comprising an alkaline-earth sorbent material in hydroxide form having a mixture of iron and an organic compound incorporated within its bulk structure as promoting agents to form an organo-metallic complex of said iron and said organic compound wherein said iron and said organic compound are both present in a molar ratio to alkaline-earth sorbent material in an amount of greater than or equal to 0.005.

8. The sorbent of claim 7 wherein said organic compound is selected from the group consisting of glucose, fructose, glycerol, sorbitol, gluconic acid and mixtures thereof.

9. The sorbent of claim 7 wherein iron and said organic compound are both present in a molar ratio to said alkaline-earth sorbent material in the range of 0.005 and 0.1.

10. The sorbent of claim 7 wherein iron and said organic compound are both present in a molar ratio to said alkaline-earth sorbent material in the range of 0.01 and 0.03.

11. The sorbent of claim 7 wherein the organic compound-to-iron molar ratio is in the range of from about 0.25 to about 4.0.

12. The sorbent of claim 7 wherein the organic compound-to-iron molar ratio is in the range of from about 0.3 to about 1.0.

* * * * *